United States Patent [19]

LaRoche

[11] Patent Number: 5,128,203
[45] Date of Patent: Jul. 7, 1992

[54] MARKING COMPRISING GLASS BEADS IN A MATRIX

[75] Inventor: Pierre Laroche, Nalinnes, Belgium

[73] Assignee: Glaverbel, Brussels, Belgium

[21] Appl. No.: 325,336

[22] Filed: Feb. 17, 1989

[30] Foreign Application Priority Data

Feb. 19, 1988 [LU] Luxembourg .......................... 87138

[51] Int. Cl.$^5$ .......................... B65D 69/00; E01F 9/04
[52] U.S. Cl. .................................... 428/325; 206/568; 404/9; 404/12; 427/137; 428/405; 428/406; 428/913
[58] Field of Search ............... 428/325, 403, 404, 405, 428/406, 913; 404/9, 12, 14; 206/568; 427/136, 137, 204, 221

[56] References Cited

U.S. PATENT DOCUMENTS

| | | | |
|---|---|---|---|
| 2,897,732 | 8/1959 | Shuger | 94/1.5 |
| 3,110,614 | 11/1963 | de Vries | 117/100 |
| 3,222,204 | 12/1965 | Weber et al. | 427/202 X |
| 3,286,604 | 11/1966 | de Vries | 428/407 X |
| 3,441,535 | 4/1969 | Beacham et al. | 523/217 |
| 3,492,149 | 1/1970 | Zisman et al. | 117/75 |
| 3,492,150 | 1/1970 | Zisman et al. | 117/75 |
| 3,519,594 | 7/1970 | Michaels | 260/41 |
| 3,617,333 | 11/1971 | Brown | 428/406 |
| 3,971,753 | 1/1976 | Frechtling et al. | 428/406 |
| 4,034,139 | 7/1977 | Mazarguil et al. | 428/406 |
| 4,111,893 | 12/1978 | Adachi et al. | 260/40 TN |
| 4,139,660 | 2/1979 | Tur | 427/353 |
| 4,214,914 | 3/1980 | Ivanchev et al. | 428/406 |
| 4,282,281 | 8/1981 | Ethen | 428/149 |
| 4,305,863 | 9/1981 | Gasman et al. | 260/40 R X |
| 4,574,109 | 3/1986 | LaRoche | 428/406 |
| 4,609,587 | 9/1986 | Giordano et al. | 428/325 |
| 4,713,295 | 12/1987 | LaRoche | 428/407 |
| 4,728,700 | 3/1988 | Patterson | 523/217 |
| 4,761,440 | 8/1988 | LaRoche | 523/217 |

FOREIGN PATENT DOCUMENTS

| | | |
|---|---|---|
| 47824 | 4/1974 | Australia . |
| 0835821 | 3/1970 | Canada . |
| 0003836 | 9/1979 | European Pat. Off. . |
| 0093495 | 11/1983 | European Pat. Off. . |
| 3140396 | 12/1978 | Japan ............... 523/217 |
| 1037873 | 8/1966 | United Kingdom . |
| 1154055 | 6/1969 | United Kingdom . |
| 1183289 | 3/1970 | United Kingdom . |
| 1191688 | 5/1970 | United Kingdom . |
| 1284676 | 8/1972 | United Kingdom . |
| 1410085 | 10/1975 | United Kingdom . |
| 1436997 | 5/1976 | United Kingdom . |
| 1517910 | 7/1978 | United Kingdom . |
| 1520856 | 8/1978 | United Kingdom . |
| 1577509 | 10/1980 | United Kingdom . |
| 2161489 | 1/1986 | United Kingdom . |
| 2175224 | 11/1986 | United Kingdom . |

OTHER PUBLICATIONS

*Chemical Abstracts*, vol. 74, No. 14 Apr. 5, 1971, p. 38, Resume No. 64948a.

*Primary Examiner*—George F. Lesmes
*Assistant Examiner*—Christopher Brown
*Attorney, Agent, or Firm*—Spencer, Frank & Schneider

[57] ABSTRACT

A marking kit whose constituents are capable of forming a marking material includes a polymeric matrix-forming material and coated glass beads for incorporation into the matrix. Surface coated glass beads suitable for incorporation into the matrix are also disclosed, as is a process for the surface coating of the glass beads, a reflective surface marking comprising a synthetic polymeric matrix incorporating the coated glass beads; and a process for the reflective marking of a surface. Glass beads are surface coated with a material effective to provide the coated glass beads with a surface tension greater than that of the matrix-forming material and ranging from 30 to 70 mN/m. In the surface treatment, the beads may be brought into contact with at least one organic or organo-metallic compound selected from the group consisting of chloro-, boromo-, iodo-, amino-, chloroamino-, mercapto-, and epoxy-compounds to form a coating on their surface of a type which makes them hydrophobic and gives the beads a surface tension within the most preferred range of 30 to 51 mN/m. The reflective surface marking may be formed by applying a suitable thickness of polymeric matrix-forming material on a surface, such as pavement, and sprinkling and coated glass beads on the surface of that matrix-forming material before it hardens.

26 Claims, No Drawings

MARKING COMPRISING GLASS BEADS IN A MATRIX

BACKGROUND OF THE INVENTION

1. Field of the Invention

This invention relates to a marking kit which comprises material which is capable of forming a matrix of marking material together with glass beads for incorporation into such a matrix, to surface treated glass beads suitable for incorporation into such a matrix, and to a process for the surface treatment of such glass beads. The invention also extends to a reflective surface marking comprising a synthetic matrix incorporating glass beads, and to a process for the reflective marking of a surface.

2. Description of the Related Art

The invention is particularly, but not exclusively, concerned with the formation of reflective markings on pavements of various kinds. The most extensive use of such markings is probably as lane markings on roads and/or as indications of rights of way at intersections. Other examples of such markings are lines or other markings on paved aircraft runways and taxiways and lines indicating spaces in car parks. Another example is that of reflective paints which find wide use in road traffic signs.

Such markings are given their reflective properties by incorporating glass beads into a matrix. The glass beads may be solid or hollow glass spheres, having a mean diameter in the range from some tens of micrometers up to several millimeters. It will be appreciated that for reasons of mechanical resistance, pavement markings usually incorporate solid glass beads. When glass beads are added to a liquid material which is capable of forming the matrix, that matrix contains beads distributed within its mass and/or in surface layers. The liquid material to be used to form the matrix can be a molten material, or a solution or a dispersion and it can be polymerized or polymerizable.

The reason for using reflective markings is so that the markings may be clearly visible at night. Their high visibility is promoted by incorporating glass beads into the markings to reflect light given out by a vehicle's headlights back towards the driver of the vehicle. It is quite clear that in order to obtain this result, some glass beads at least must be exposed at the surface of the markings. However, if the beads are too exposed at the surface and do not have good adhesion to the marking, there is, in the case of pavement markings, a risk that they may be easily abraded from the marking by traffic. Eventually most of the beads will become removed so that the marking becomes poorly reflective and thus less visible at night. It is thus desirable that the beads are well embedded into the matrix of marking material and have strong adhesion to it. It can also be desirable that the beads are well distributed through the thickness of the matrix of marking material in order to maintain good reflectivity as long as possible. Indeed, as the matrix-forming material wears, layers of matrix are abraded releasing some beads. If beads are distributed through the thickness of the matrix, they will be exposed by this process and will maintain the reflectivity. On the other hand, if the reflective marking is to be used under circumstances in which it will not be exposed to such a high degree of wear, for example on road traffic signs, it is desirable that the beads should be mainly at the surface of the matrix of marking material, while being adequately bound to it to resist weathering, and that they should be embedded in the layer of matrix-forming material to the degree appropriate for optimal retro-reflection.

Some synthetic polymer matrices, especially for use in surface markings, which have recently appeared on the market, are relatively viscous in the unhardened state, for example because they contain a significant loading of solids. One such instance is materials for road markings in the form of small patches. When glass beads which are intended to be light reflective, are sprinkled on the unhardened matrix-forming material, they float on that material without penetrating sufficiently into the body of the material. The result is that the beads are easily removed from the matrix even by weak abrasion. If they are at the surface of the matrix to make it reflective, the retro-reflection obtained can be inadequate or can quickly become so.

SUMMARY OF THE INVENTION

It is an object of the present invention to provide a marking kit which comprises liquid material which is capable of forming a matrix of marking material together with glass beads which are specially suited for easy incorporation into such a matrix in a well dispersed way.

According to the present invention in its first aspect, there is provided a marking kit which comprises material which is capable of forming a matrix of marking material together with glass beads for incorporation into such a matrix, characterised in that such matrix-forming material is liquid at 20° C. and such glass beads comprise beads whose surfaces have been treated so that the surface tension of the treated beads, when measured by the method herein set forth, has a value below 70 mN/m and greater than that of the surface tension of such liquid matrix-forming material. (1 mN/m=1 dyn/cm)

The method which we specify for the measurement of the surface tension of the treated beads is an indirect method, and it as follows. The same treatment as was applied to the beads is applied to a sheet of glass of the same chemical composition as the beads. A drop of a reference liquid, the surface tension of which is known under the experimental conditions, is placed onto the surface which has been treated in this way. The surface tension of the treated surface and thus of the treated beads, can be evaluated by measuring the angle theta between the surface of the drop and the treated surface of the glass sheet and using the equation of Young and Dupré quoted in "Physical Chemistry of Surfaces" (second edition) by Arthur W. Adamson (Department of Chemistry, University of Southern California, Los Angeles, Calif.), published by "Interscience Publishers". The measurement is effected at 20° C.

Uncoated glass when newly produced typically has a surface tension in the region of 300 mN/m. This value drops quickly because the surface absorbs moisture. Water at 20° C. has a surface tension of 72.8 mN/m.

An approximation to the surface tension of the treated beads may also be obtained directly. Such an approximation may be obtained by placing a layer of the treated beads in a small bowl, and slowly introducing underneath the beads a reference liquid, the surface tension of which is known under the experimental conditions, and directly observing whether the beads float or not. This experiment may be repeated with several reference liquids so as to determine the value of the surface tension of the beads. Among others, hexadecane (27.6 mN/m), xylene (30 mN/m), bicyclohexane (33 mN/m), alpha-methylnaphthalene (38.6 mN/m), alpha-chloronaphthalene (42.9 mN/m), ethylene glycol (47.7 mN/m), methylene iodide (50.8 mN/m) and formamide (58.2 mN/m), can be used as reference liquids.

The method to be used for the measurement of the surface tension of the matrix-forming material of the kit according to the first aspect of this invention is the classical ring-extraction method performed at 20° C. on fresh material, prior to any significant hardening thereof. In the case of a multi-component matrix-forming material, the measurement of surface tension should of course be made on the mixed components, immediately after mixing thereof.

A marking kit according to the first aspect of the invention may include a matrix-forming material of various kinds. Such material may be a solution or emulsion which sets by the evaporation of solvent or liquid phase, or it may be a material which sets by polymerisation or cross-linking. Such matrix-forming material may be a two-component material, for example comprising a polymerisable resin and a catalyst. Such materials may be applied to form markings at ambient temperatures.

It will be noted that the first aspect of the invention does not include thermoplastics materials which are in solid state at 20° C. as matrix-forming materials, though these materials may be used for forming markings. The use of such materials is however comprehended by the second aspect of the invention which provides a marking kit which comprises material which is capable of forming a matrix of marking material together with glass beads for incorporation into such a matrix, characterised in that such glass beads comprise beads whose surfaces have been treated so that the surface tension of the treated beads, when measured by the method herein set forth, has a value below 70 mN/m and in that such kit further comprises instructions for bringing said beads and such matrix-forming material into contact under conditions such that the matrix-forming material material is in liquid state and the surface tension of the treated beads is greater than the surface tension of said matrix-forming material at the time of their first contact.

Such instructions might for example specify conditions for the mixing of a multi-component matrix-forming material, or for an apparatus or a temperature of application of for example a thermoplastics matrix-forming material, together with directions for applying the matrix-forming material and thereafter applying treated beads within a given period of time, or simply as soon as possible.

The surface tension of the treated beads for use in a kit according to the second aspect of the invention is to be measured as hereinbefore specified, and the surface tension of the matrix-forming material is to be measured using the classical ring-extraction method under the conditions specified in the instructions for its first contact with the beads.

The Applicant has discovered that, surprisingly, glass beads which have a surface tension below 70 mN/m, are easily embedded into a large variety of matrix-forming materials in the unhardened state when they have a surface tension which is greater than that of the fluid, matrix-forming material. This is especially so in respect of synthetic polymer materials which are relatively viscous in the unhardened state, such as certain new thermoplastic matrix-forming materials or two-component matrix-forming materials which have a high solids content, containing for example as little as 20% of resin and as much as 80% filler. These solids are usually used as filler to reduce the cost of the markings. But they can also be used to improve the mechanical durability of hardened markings, especially their resistance to abrasion, and/or in order to colour the marking. When beads adapted for use in the invention are sprinkled on markings of this type while they are still wet before hardening, they become well embedded into the marking and this is quite unexpected considering the high viscosity of these marking materials.

The Applicant has also found that, surprisingly, beads adapted for use in the invention can be easily incorporated into less viscous synthetic polymer matrix-forming materials which are essentially in the unhardened state, but from which the solvent has partially evaporated at the moment when the beads are added. This may for example happen when using traditional marking materials in hot countries, when the matrix-forming material quickly becomes very viscous because of the evaporation of solvent. Despite this evaporation, the glass beads adapted for use in the invention, thrown on quickly after spreading of the matrix-forming material, penetrate that material enough to obtain an acceptable and long-lasting retro-reflection in the hardened marking, while glass beads of the hitherto known type remain too much exposed at the surface.

This behaviour of beads in a composition according to the invention is completely unexpected and has not been explained. A partial explanation is perhaps based on the fact that the beads have a high surface tension compared with the matrix-forming material before hardening and that the attractive force thus generated at their interface when they first come into contact would promote the absorption of the beads, even into highly viscous fluids. Whatever it may be, an incorporation or embedding of the beads of a marking kit according to the invention is clearly observed under conditions in which traditional beads remain on the surface.

For reflective markings, it is estimated that the best results are obtained, from the standpoint of retro-reflection, if the glass beads are sunk into the matrix-forming material to the extent of 40 to 60% of their volume. The matrix-forming material covering the sunken part of a bead thus acts as an opaque layer making a kind of mirror with the glass, and the exposed part of the bead allows light rays from a vehicle headlight to enter and leave, and be reflected back towards the driver. This optimal immersion also allows a good bond between bead and matrix, and that ensures that retro-reflection remains appreciably stable over time.

Moreover, beads of a composition according to the invention are hydrophobic with the result that they do not tend to adsorb atmospheric moisture, and this allows their rheological properties to be maintained over time and particularly during handling. The glass beads are often so small that they behave like a highly free-flowing powder. If moisture were to accumulate on the surfaces of such beads, it could well cause agglomeration of the beads which would detract from their free flow and hence from their fluid properties, so that it would become difficult to obtain an even distribution of the beads over the surface of freshly applied matrix-forming material. Moreover, when moisture has accumulated on the surface of the beads it can prevent cohesion between the beads and the matrix-forming material.

In the most preferred embodiments of either aspect of the invention, the said surface tension of the treated glass beads lies within the range 30 to 51 mN/m inclusive. Such a reduced maximum permissible surface tension increases the hydrophobic properties of the beads. Treated glass beads having a surface tension within the specified range have a surface tension which is greater than that of many matrix-forming materials in view.

Preferably, the surface tension of the treated glass beads adapted for use in the invention is in the range 33 to 48 mN/m inclusive, and optimally it is in the range 37 to 45 mN/m inclusive. Treated beads having a surface tension within this range of values are most suitable for filling synthetic marking materials which have high surface tension. Treated glass beads of this kind are also most suitable for incorporation into a matrix-forming material from which the solvent has partially evaporated. Despite the high viscosity of these matrix-forming materials, and/or their low fluid content, good wetting of the beads is observed.

It is advantageous if the glass beads bear a surface coating containing at least one organic or organo-metallic compound selected from chloro, bromo, iodo, amino, chloroamino, mercapto and epoxy compounds. Forming such a coating is an easy way of treating the beads to give them a well-regulated surface tension, while using small quantities of material. Among these compounds, some can easily be found which alter the surface tension of the beads favourably and long-lastingly from that of untreated glass for the purpose of the invention. A very small quantity of this type of compound can form an adequate coating. A layer one molecule thick, even incomplete, can give treated glass beads the desired surface tension.

For example such a coating may advantageously include a chloro, bromo, iodo, or amino titanate, or a titanate containing an epoxy functional group. These organo-metallic substances can easily adhere to glass beads and give their surfaces the desired surface tension. Preferably however, the glass beads bear a surface coating which includes at least one silane. For example beta-(p-chlorophenyl) ethylsilane may be used. Silanes usually have an affinity for glass which allows the formation of a durable coating on the glass beads. Silane compounds are usually selected for their property of coupling glass to polymer. It is quite surprising that they can also act as surfactants to give the beads a surface tension lying within a relatively high range of values.

This coating on the beads can be formed from a single component such as, for example, a chloro or amino titanate, or a silane. Preferably, however, the glass beads bear a surface coating formed from a mixture of substances including at least one first substance ("tension reducer") which acts to reduce the surface tension of the beads and at least one second substance ("tension moderator") which acts to moderate the reduction in surface tension obtained with the tension reducer. The two substances usually have different affinities for glass. It might thus have been expected that one of the substances would occupy the surface of the bead and prevent the other substance from having any action. It might also have been feared that the two substances would themselves combine by copolymerization on the surface for example. However the Applicant has found that, in a completely unexpected manner, despite the opposing properties of the two substances, their use as a mixture easily provides glass beads having a reproducibly controllable surface tension in the ranges of values indicated above. Selection of the relative amounts of the two substances can also lead to matching of a desired surface tension. Moreover, one of the substances can have an additional function, such as increasing the adhesion between bead and matrix. It is clear that with two different substances, it is necessary to make sure that there is no incompatibility between them or with the matrix in which the beads are intended to be incorporated.

In preferred embodiments of the invention, the said tension reducer includes a coupling compound capable of making a bond between glass and polymers. The expression "coupling compound" as used herein denotes a compound capable of making a chemical bond with the glass on the one hand and with polymers on the other hand, the latter bond being covalent, Van der Waals, ionic or of some other kind. Glass beads coated in this way have high adhesion to polymers from which marking matrices may be formed. They will thus be well bound to the matrix in which they exist, which is an especially appreciable advantage when the beads have to be exposed at the surfaces of matrices which are subject to abrasion or erosion, as for example in reflective pavement markings or markings on sign boards which are exposed to weathering.

Advantageously, the said tension reducer contains an organo-functional silane. The term "organo-functional" is used herein to denote silanes in which the silicon is capable of linking to the material of a surrounding polymeric matrix through an intermediate chain of carbon atoms. This type of substance, while having a great affinity for the glassy material of the bead and reducing the surface tension of the bead, has the feature of also possessing a good affinity for the majority of polymers suitable for forming marking matrices of the kind in view. For this reason the adhesion of glass beads to matrices of this kind, into which they can be incorporated, is particularly high.

In this regard, the said tension reducer preferably comprises an organo-functional silane selected from epoxy-, phenyl-, or amino-silanes or olefinic silanes, or a straight or branched chain saturated alkyl silane having from 1 to 18 carbon atoms. These silanes are particularly useful for promoting the adhesion of glass beads to polymers currently used as matrices in markings. The following compounds can be mentioned as examples: 3-(triethoxysilyl)propylcyclopentadiene, methacryloxypropyl trimethoxysilane, vinyl triethoxysilane, octadecyl trichlorosilane, octyl triethoxysilane, and N-beta-(N-vinylbenzylaminoethyl)-gamma-aminopropyl trimethoxysilane. These substances, notwithstanding their property of increasing adhesion, are able to give glass beads a relatively low surface tension.

Preferably, the said tension moderator comprises an organic or organo-metallic compound selected from chloro, bromo, iodo, amino, chloramino, mercapto and epoxy compounds. There can easily be found from among these compounds a surface active substance which can moderate the reduction in surface tension afforded by a said tension reducer, or in other words, increase the surface tension of the beads from a value which would be obtained with the tension reducer alone, to a desired value within the scope of the invention, and which is capable of bonding to glass at the same time as the tension reducer. It is surprising to mix these compounds with the tension reducer because the tension reducer is usually selected to increase the adhesion of beads to the matrix-forming material, whereas these moderating compounds can have the opposite effect, that is they can reduce such adhesion. The mixing of substances having such opposed effects is quite unexpected. The Applicant has however established that this procedure not only allows easy adjustment of the surface tension of the beads within a range of values, but could also be of significant advantage in adjusting the adhesion of beads to the matrix, in which they are intended to be incorporated, to a particular value if desired.

Chloro or amino titanates are, for example, compounds which can be advantageously used as tension moderators according to the invention, in combination especially with a "coupling" silane as tension reducer.

Preferably however, the said tension moderator comprises a chlorosilane. This type of silane, while beneficially increasing the surface tension of the bead relative to the surface tension which the bead would have had when using the tension reducer alone, has a great affinity for glass which is especially valuable for coating the surface of glass beads.

Amongst chloro-silanes suitable for this purpose are, for example, 1-trimethoxysilyl-2(p,m-chloromethyl) phenylethane, 2-(p-chlorophenyl)-ethyl triethoxysilane, and 3-chloropropyl-methyl dimethoxysilane. A chlorophenylsilane or a chloropropylsilane, which are well adapted to the aim of incorporating beads in polymeric surface markings and which are compatible with the presence of organo-functional silicon compounds, are however preferred.

Advantageously, the said coating contains between one and three times as much of the tension moderator as the tension reducer by weight. These proportions can readily give glass beads a surface tension in the range of 30 to 51 mN/m and can allow a quite acceptable level of adhesion to resin.

Beads having one or more of the features herein set forth are themselves believed to be new, and the invention accordingly extends to surface treated glass beads characterised in that they are hydrophobic and that their surface tension is within the range 30 to 70 mN/m, when measured by the method herein set forth. Such beads have advantages for use in reflective marking layers as hereinbefore adverted to.

The present invention also relates to a process for the surface treatment of glass beads, characterised in that the beads are brought into contact with at least one organic or organo-metallic compound selected from chloro, bromo, iodo, amino, chloroamino, mercapto and epoxy compounds to form a coating on their surface of a type which makes them hydrophobic and gives the beads a surface tension within the range 30 to 70 mN/m, when measured by the method herein set forth.

This method of treating the surface of glass beads has been found to be one which is simple to perform, is reproducible in mass production, and is quick and reliable. The Applicant has unexpectedly discovered that when the beads are brought into contact with at least one substance of that kind, a coating is formed on the surface of the beads which gives them particularly advantageous properties. Indeed, it has been found, quite surprisingly, that beads treated according to the process can be embedded or incorporated easily in relatively viscous polymer matrices, such as, for example, matrix-forming materials which are highly filled with solids or resins which are very viscous or from which the solvent has partially evaporated. Although the reasons for this are not completely understood, it may be speculated that the range of surface tension of beads coated in this way favours the embedding process. Beads treated in this way are also hydrophobic, which is an important advantage when they are handled, and which helps to retain their specific properties over time, especially in storage but also in use, when they are incorporated into a polymer matrix.

Treatment of glass beads to give them such a high surface tension, especially where beads intended for retro-reflection are concerned, is most unexpected. Currently known treatments of beads for retro-reflection are noticeably aimed at producing the opposite effect, that is a reduction in the surface tension of the beads to obtain values of the order of 20 mN/m, close to the surface tension of solvents for the customary surface markings, so as to keep them at the surface of the marking.

Advantageously, said compound(s) is or are selected so that the said surface tension of the treated beads is in the range 30 to 51 mN/m, preferably, the said compound(s) is or are selected so that the surface tension of coated beads is in the range 33 to 48 mN/m, and optimally within the range 37 to 45 mN/m. It has been confirmed that beads which have been treated in such a way can easily be used as a filler in resins with a high surface tension or high viscosity, in particular as reflective components in highly filled matrix-forming materials or surface marking materials which are applied under conditions of relatively high air temperature.

The coating can be formed from a single compound of this type. For example a chloro or amino titanate or a chloro silane can be used alone with advantage. Preferably however, the beads are brought into contact with a mixture of substances including at least one first substance ("tension reducer") which acts to reduce the surface tension of the coated beads and at least one second substance ("tension moderator") which moderates such reduction in surface tension. It has been found that it is possible in this way to control the properties given to glass beads more easily than by using a single substance. The oleophilic nature of glass beads can thus easily be adjusted by carefully altering the proportions of the two said substances so as to obtain the desired wetting between the glass beads and the matrix in which they are intended to be incorporated.

This process is completely unexpected because it calls for the use of a mixture of substances having opposing effects. It is very surprising to achieve the objective in such a manner. It would not be expected to treat the surface of beads by bringing the beads into contact with a mixture of substances having such opposing properties, because the difference in affinity of these substances to glass could logically lead to spoiling the effect of one of the substances on the surface by the other substance or otherwise to one of the substances being preferentially attached to the glass and the other substance being attached to the one substance.

The use of a said tension reducer alone could reduce the surface tension of treated beads to such an extent that they are made oleophobic. Preferably however, the said tension reducer makes the beads hydrophobic and oleophilic. This behaviour is a suitable starting point for adjusting the surface tension of beads to relatively high values. Moreover, a selection of substances which have an affinity for glass becomes available.

Preferably, the said tension reducer includes a coupling compound capable of making a bond between glass and polymers. This is particularly valuable when beads must be strongly bonded to a matrix of the polymeric type into which they are incorporated, especially when this matrix is exposed to erosion and when the loss of beads by abrasion detracts from the performance of the matrix. Covalent bonding to the glass ensures that beads are firmly held.

Advantageously, the said tension reducer includes an organo-functional silane, and preferably the said silane is selected from epoxy-, phenyl- or amino-silanes or olefinic silanes, or a straight or branched chain, saturated alkyl silane having from 1 to 18 carbon atoms. This type of substance not only has the advantage of bonding easily to glass but additionally it promotes adhesion to polymers. These silanes are particularly advantageous for the purpose for which the tension reducer is used. These substances are easily deposited on the glass beads by simple mixing with beads and drying. For example, the following can be used: 3-(triethoxysilyl)-propyl-cyclo-pentadiene, methacryloxypropyl trimethoxysilane, vinyl triethoxysilane, octadecyl trichlorosilane, octyl triethoxysilane, or N-beta-(N-vinylbenzylaminoethyl)-gamma-aminopropyl trimethoxysilane.

Preferably, the said tension moderator is the one which includes the said organic or organo-metallic compound selected from chloro, bromo, iodo, amino, chloramino, mercapto and epoxy compounds. These compounds are surfactants which are particularly advantageous in functioning as the tension moderator as described above. They readily promote an increase in surface tension from a surface tension value which would be afforded by the use of a said tension reducer alone. As an example, a chloro, bromo, iodo, or amino titanate or a titanate with an epoxy functional group can be used with advantage as tension moderator in combination with a silane which promotes adhesion.

Preferably, the said tension moderator includes a chlorosilane. This type of silane is advantageous for increasing surface tension relative to that which would have been reached had the tension reducer been used on its own and it also has a particular affinity for glass. The silane may or may not have a functional group attached to the silicon atom.

As the tension moderator, 1-trimethoxysilyl-2-(p,m-chloromethyl)phenylethane, 2-(p-chlorophenyl)-ethyl triethoxysilane, or 3-chloropropyl-methyl dimethoxysilane can be used. Preferably however the said tension moderator is a chlorophenylsilane or a chloropropylsilane. These silanes are well adapted to being used in the process according to the invention. They can readily be mixed with the tension reducer, then brought into contact with the beads and dried to form the coating.

Preferably the said mixture contains between one and three times as much of the tension moderator as of the tension reducer, by weight. These proportions allow the successful adjustment of the surface tension of glass beads.

The invention also comprises glass beads treated by a process as defined above.

The present invention also includes a reflective surface marking comprising a synthetic matrix incorporating glass beads, wherein some at least of the beads are treated glass beads as hereinbefore defined. Such markings are useful for many purposes. As an example, a marking can be mentioned in which glass beads are exposed to reflect light whilst also being firmly bound to the matrix-forming material so as to withstand abrasion. More specifically, it can comprehend the use of matrix-forming materials which, because of their specific properties, or because of the evaporation of solvent caused for example, by working conditions, are relatively viscous at the moment when beads are introduced. It has been found that the proportion exposed, and hence the reflectivity, and the degree of abrasion resistance can easily be adjusted by suitably selecting the surface tension of the treated glass beads.

Preferably, the reflective surface marking is formed from resin and fillers together with said treated glass beads as further adjuvant, said fillers constituting at least 50% by weight of the marking. In the unhardened fluid state, these matrix-forming materials have a very high viscosity, so that it is difficult for glass beads which have been treated in the manner known hitherto to penetrate them and to be wetted by them. The incorporation of beads adapted for use in the invention in the marking produces a matrix which is particularly useful for road markings. For example, a marking of this kind may contain 20% of resin and 80% total adjuvants, including fillers and treated glass beads. It may for example include a thermoplastic material or a two-component material for forming the marking matrix.

The present invention also extends to a process for the reflective marking of a surface, characterised in that it includes the application of a marking layer of liquid matrix-forming material to a surface followed by sprinkling, on top of the layer of matrix-forming material, while it is still freshly laid and fluid, glass beads of which at least some are glass beads whose surfaces have been treated so that the surface tension of the treated beads, when measured by the method herein set forth, has a value below 70 mN/m and greater than that of the surface tension of such matrix-forming material at the time when the beads are applied thereto.

It is especially suitable to use in such method a marking kit having any of the preferred features herein set forth.

The present invention is particularly useful for making reflective markings on pavement surfaces.

DESCRIPTION OF THE PREFERRED EMBODIMENTS

Various preferred embodiments of the invention will now be described by way of example only.

In the Examples, the glass beads have dimensions in the range 200 to 600 micrometres.

EXAMPLE I

A marking kit consists of treated glass beads and a solution of acrylic matrix-forming material.

The glass beads were mixed with a treatment medium consisting of a solution of 90% methanol and 10% water to which had been added beta-(p-chlorophenyl) ethylsilane at the rate of 0.1 g per kg of beads, so as to coat the beads giving the treated beads on average a surface tension of 45 mN/m and making them hydrophobic and oleophilic.

The acrylic matrix-forming material was of the type used for forming markings on road surfaces and having as base solvents mixtures of paraffinic and oleofinic hydrocarbons. That material was applied to a surface which had been brought to a temperature of approximately 35° C. to 38° C. in an environment of approximately the same temperature. This matrix-forming material has a surface tension of 32 mN/m in the unhardened, fluid state, at a temperature of 20° C. The viscosity of the matrix-forming material had rapidly increased however, because of the relatively high surface and environmental temperatures. Beads treated as described were sprinkled onto the surface marking while it was still freshly laid and while the treated beads had a higher surface tension than the matrix-forming material. These beads were wetted by the matrix-forming material, so that they penetrated appreciably, to a depth of half their diameter. When hardening of the marking was complete, its reflectivity expressed in mCd/Lx.m2 was measured by means of an instrument obtainable under the trade mark ECOLUX from Laboratoire Central des Ponts et Chaussées, 58 Boulevard Lefévre, 75732 Paris Cedex 15, France. This instrument is designed to project a light beam down onto a horizontal road surface at an angle of 3°30' and to detect the light intensity reflected back by this surface at an angle of 4°30', to simulate the light which reaches the driver of a vehicle from his vehicle's headlights. The value obtained was 540 mCd/Lx.m2.

By comparison, instead of beads treated as described above, hitherto known water repellent beads having a surface tension in the region of 26 mN/m, were used. Under the same conditions, these beads remained on the surface of the marking before it solidified to such an extent that at the least abrasion of the dried marking most of the surface beads were dislodged, that is removed from their locations at the surface of the marking. A retro-reflection of 350 mCd/Lx.m2 was obtained from the newly hardened marking, while after three weeks, the value was no more than 50 mCd/Lx.m2.

EXAMPLE II

A marking kit consists of treated glass beads and a two-component acrylic matrix-forming material. The kit included instructions to mix the matrix-forming material and apply it to the surface to be marked as soon as possible thereafter, and to sprinkle the treated glass beads over the applied matrix-forming material within 1 minute of mixing of the acrylic material.

The glass beads were mixed with a treatment medium consisting of a solution of a mixture of two substances in toluene. The first substance was a vinyl triethoxysilane as tension reducer, and the second substance, as tension moderator, was 4-aminobenzenesulphonyl, dodecylbenzenesulphonyl, ethylene titanate. The two substances were mixed in equal proportions at the rate of 0.08 g of each substance per kg of treated beads. The treatment medium was used to coat the glass beads. If the tension reducer had been used alone, the beads would have had on average a surface tension of 28 mN/m. The mixture of the two substances gave them a surface tension of 38 mN/m.

At the edges of a road, lines of patches were laid about 4 to 5 mm in thickness, consisting of a marking formed from a matrix-forming resin and filled with glass beads, of the usual water repellent kind, to an amount of 40% by weight. The matrix-forming material used was a two-component acrylic resin. It had a surface tension of 30 to 32 mN/m measured by the ring-extraction method at various times up to 1 minute after mixing. However, its viscosity is very high, since it is highly filled with solids. Glass beads treated in the way described above, were sprinkled on these patches, while the marking was still freshly laid and the surface tension of the beads was greater than that of the matrix-forming material, to produce retro-reflective patches which remained effective when the road was covered by a layer of water in wet weather. These beads were wetted by the matrix-forming material, so that they were appreciably embedded, to a depth of half of their diameter. Within 20 minutes the marking hardened sufficiently to withstand abrasion due to the flow of traffic. When hardening of the marking was complete, its reflectivity expressed in mCd/Lx.m2 was measured as in the previous example. A value of 650 mCd/Lx.m2 was obtained. About three weeks later, after the patches had been exposed to wear and weathering, a value of 650 mCd/Lx.m2 was still obtained. The tension reducer of the treatment mixture for the beads, by forming a covalent bond with glass on the hand and a chemical bond with the matrix-forming material on the other hand, has thus promoted the effective adhesion of glass beads to the matrix.

By comparison, instead of beads treated as described above, the usual floating beads have been used, which have been treated with a fluorocarbon product to give a surface tension of 22 mN/m. Microscopic examination shows that the beads remained on the surface of patches made from the matrix-forming material. A value of 380 mCd/Lx.m2 was obtained. After about three weeks of wear and weathering, most of the surface beads had been removed and the retroreflection of the patches had fallen to 70 mCd/Lx.m2.

EXAMPLE III

A marking kit consists of treated glass beads and matrix-forming material. The matrix forming material was "SINOFLEX STIC B" (Trade Mark) from STIC B, 92 Avenue Victor-Hugo 93301 Aubervillers-Cedex.

The glass beads were mixed with a treatment medium which consisted of a solution of a mixture of 3-(triethoxysilyl)propyl-cyclopentadiene as tension reducer and 2-p-chlorophenyl-ethyl triethoxysilane as tension moderator in methanol. Proportions of the two substances were selected at the rate of twice as much of the tension moderator as the tension reducer, that is 0.04 g of the tension reducer and 0.08 g of the tension moderator per kg of beads. If the tension reducer were used alone, the treated beads would have on average a surface tension of 30 mN/m. The mixture of the two substances gave them a surface tension of 40 mN/m.

Reflective markings are laid on an asphalt surface, for example to make a walkway for pedestrians, using the specified matrix-forming material laid to a thickness of about 1.5 mm and then throwing glass beads treated in the manner described above onto the still wet surface of the matrix-forming material. The beads are spread on at the rate of 350 g/m2. This matrix-forming material has a stiff consistency and had a surface tension of 34 to 35 mN/m when the beads were first applied. When hardening of the marking was complete, its reflectivity expressed in mCd/Lx.m2 was measured in the same way as in the preceding examples. A value of 350 mCd/Lx.m2 was obtained. About three weeks later, after the reflective markings had been exposed to wear and weathering, a value of 310 mCd/Lx.m2 was still obtained.

EXAMPLE IV

A marking kit consists of treated glass beads and a thermoplastics matrix-forming material. The kit included instructions to apply the thermoplastics material to the surface to be marked while it was at elevated temperature and in liquid state, and to sprinkle the treated glass beads over the applied matrix-forming material while it was still hot (at about 180° C.) and liquid.

Glass beads are mixed with a treatment medium consisting of a solution of a mixture of N-beta-(N-vinylbenzylaminoethyl)-gamma-aminopropyl trimethoxysilane as tension reducer and chloropropyl triethoxysilane as tension moderator in methanol. Proportions of the two substances are selected at the rate of 5 times as much tension moderator as tension reducer, that is 0.03 g of the tension reducer and 0.15 g of the tension moderator per kg of treated beads. The mixture of the two substances gives a surface tension of 44 mN/m.

These glass beads were sprinkled on the thermoplastic matrix-forming material in the hot state, this being of the alkyde type with 35% filler. This matrix-forming material had a surface tension of 28 mN/m at its temperature when the beads were applied. When hardening of the marking was complete, its reflectivity expressed in mCd/Lx.m2 was measured in the same way as in the previous examples. A value of 350 mCd/Lx.m2 was obtained.

EXAMPLE V

A marking kit consists of treated glass beads and a thermoplastics matrix-forming material. The kit included instructions to apply the thermoplastics material to the surface to be marked while it was at elevated temperature and in liquid state, and to sprinkle the treated glass beads over the applied matrix-forming material while it was still hot and liquid.

Beads of glass were mixed with a treatment medium consisting of a solution in carbon tetrachloride of a mixture of octadecyl trichlorosilane as tension reducer and 1-trimethylsilyl-2-(p,m,-chloromethyl)-phenylethane as tension moderator. Proportions of the two substances were selected at the rate of twice as much of the tension reducer as of the tension moderator, that is 0.1 g of the tension reducer and 0.05 g of the tension moderator per kg of treated beads. The mixture of the two substances gave a surface tension of 36 mN/m to the treated beads.

The treated glass beads were sprinkled on a layer of thermoplastics material of the Escorez type in the hot state, this being based on hydrocarbons and highly filled with solids (60%). This matrix-forming material has a surface tension of 30 mN/m. When hardening of the marking was complete, its reflectivity expressed in mCd/Lx.m2 was measured in the same way as in the previous examples. A value of 300 mCd/Lx.m2 was obtained. Their adhesion to the matrix-forming material was quite satisfactory.

What is claimed is:

1. A marking kit whose constituents are capable of forming a marking material, the marking kit comprising:
   a polymeric matrix-forming material which is liquid at 20° C.; and
   coated glass beads for incorporation into the polymeric matrix-forming material comprised of glass beads having a surface coating effective to provide the coated glass beads with a surface tension which ranges from 30 to 70 mN/m and which has a value greater than that of the polymeric matrix-forming material so that the coated glass beads substantially sink into the polymeric matrix-forming material when applied to an unhardened layer thereof,
   wherein the surface coating contains at least one of an organic compound and an organo-metallic compound, and is selected from the group consisting of chloro-, bromo-, iodo-, amino-, chloroamino-, mercapto-, and epoxy-compounds.

2. A marking kit whose constituents are capable of forming a marking material, the marking kit comprising:
   a polymeric matrix-forming material which is liquid at 20° C.; and
   coated glass beads for incorporation into the polymeric matrix-forming material comprised of glass beads having a surface coating effective to provide the coated glass beads with a surface tension which ranges from 30 to 70 mN/m and which has a value greater than that of the polymeric matrix-forming material so that the coated glass beads substantially sink into the polymeric matrix-forming material when applied to an unhardened layer thereof,
   wherein the surface coating includes at least one silane.

3. A marking kit whose constituents are capable of forming a marking material, the marking kit comprising:
   a polymeric matrix-forming material which is liquid at 20° C.; and
   coated glass beads for incorporation into the polymeric matrix-forming material comprised of glass beads having a surface coating effective to provide the coated glass beads with a surface tension which ranges from 30 to 70 mN/m and which has a value greater than that of the polymeric matrix-forming material so that the coated glass beads substantially sink into the polymeric matrix-forming material when applied to an unhardened layer thereof,
   wherein the surface coating is comprised of a mixture of substances including at least one first substance which is a tension reducer and which acts to reduce the surface tension of the glass beads, and at least one second substance which is a tension moderator and which acts to moderate the reduction in surface tension obtained with the tension reducer.

4. The marking kit according to claim 3, wherein the surface tension of the coated glass beads ranges from 30 to 51 mN/m inclusive.

5. The marking kit according to claim 4, wherein the surface tension of the coated glass beads ranges from 33 to 48 mN/m inclusive.

6. The marking kit according to claim 5, wherein the surface tension of the treated glass beads ranges from 37 to 45 mN/m inclusive.

7. The marking kit according to claim 3, wherein the tension reducer includes a coupling compound which is capable of forming bonds with the glass beads and with the polymeric matrix-forming material.

8. The marking kit according to claim 7, wherein the tension reducer includes an organo-functional silane.

9. The marking kit according to claim 8, wherein the organo-functional silane is selected from the group consisting of epoxy-, phenyl-, amino- and olefinic-silanes.

10. The marking kit according to claim 3, wherein the tension moderator includes one of an organic compound and an organo-metallic compound, and is selected from the group consisting of chloro-, bromo-, iodo-, amino-, chloroamino-, mercapto-, and epoxy-compounds.

11. The marking kit according to claim 10, wherein the tension moderator comprises a chloro-silane.

12. The marking kit according to claim 11, wherein the tension moderator is one of a chlorophenyl-silane and a chloropropyl-silane.

13. The marking kit according to claim 3, wherein the surface coating on the coated glass beads contains between one and three times as much tension moderator as tension reducer by weight.

14. A marking kit whose material constituents are capable of forming a marking material, the marking kit comprising:
a polymeric matrix-forming material;
coated glass beads for incorporation into the polymeric matrix-forming material comprised of glass beads having a surface coating effective to provide the coated glass beads with a surface tension ranging from 30 to 70 mN/m; and
instructions for bringing the coated glass beads and the polymeric matrix-forming material into contact under conditions such that the polymeric matrix-forming material is in a liquid state and the surface tension of the coated glass beads is greater than that of the polymeric matrix-forming material at the time of their first contact so that the coated glass beads substantially sink into the polymeric matrix-forming material,
wherein the surface coating contains at least one of an organic compound and an organo-metallic compound, and is selected from the group consisting of chloro-, bromo-, iodo-, amino-, chloroamino-, mercapto-, and epoxy-compounds.

15. A marking kit whose material constituents are capable of forming a marking material, the marking kit comprising:
a polymeric matrix-forming material;
coated glass beads for incorporation into the polymeric matrix-forming material comprised of glass beads having a surface coating effective to provide the coated glass beads with a surface tension ranging from 30 to 70 mN/m; and
instructions for bringing the coated glass beads and the polymeric matrix-forming material into contact under conditions such that the polymeric matrix-forming material is in a liquid state and the surface tension of the coated glass beads is greater than that of the polymeric matrix-forming material at the time of their first contact so that the coated glass beads substantially sink into the polymeric matrix-forming material,
wherein the surface coating includes at least one silane.

16. A marking kit whose material constituents are capable of forming a marking material, the marking kit comprising:
a polymeric matrix-forming material;
coated glass beads for incorporation into the polymeric matrix-forming material comprised of glass beads having a surface coating effective to provide the coated glass beads with a surface tension ranging from 30 to 70 mN/m; and
instructions for bringing the coated glass beads and the polymeric matrix-forming material into contact under conditions such that the polymeric matrix-forming material is in a liquid state and the surface tension of the coated glass beads is greater than that of the polymeric matrix-forming material at the time of their first contact so that the coated glass beads substantially sink into the polymeric matrix-forming material,
wherein the surface coating is comprised of a mixture of substances including at least one first substance which is a tension reducer and which acts to reduce the surface tension of the glass beads, and at least one second substance which is a tension moderator and which acts to moderate the reduction in surface tension obtained with the tension reducer.

17. The marking kit according to claim 16, wherein the tension reducer includes a coupling compound which is capable of forming bonds with the glass beads and with the polymeric matrix-forming material.

18. The marking kit according to claim 17, wherein the tension reducer includes an organo-functional silane.

19. The marking kit according to claim 18, wherein the organo-functional silane is selected from the group consisting of epoxy-, phenyl-, amino- and olefinic-silanes.

20. The marking kit according to claim 16, wherein the tension moderator includes one of an organic compound and an organo-metallic compound, and is selected from the group consisting of chloro-, bromo-, iodo-, amino-, chloroamino-, mercapto-, and epoxy-compounds.

21. The marking kit according to claim 20, wherein the tension moderator comprises a chloro-silane.

22. The marking kit according to claim 21, wherein the tension moderator is one of a chlorophenyl-silane and a chloropropyl-silane.

23. The marking kit according to claim 16, wherein the surface coating on the coated glass beads contains between one and three times as much tension moderator as tension reducer by weight.

24. The marking kit according to claim 16, wherein the surface tension of the coated glass beads ranges from 30 to 51 mN/m inclusive.

25. The marking kit according to claim 24, wherein the surface tension of the coated glass beads ranges from 33 to 48 mN/m inclusive.

26. The marking kit according to claim 25, wherein the surface tension of the treated glass beads ranges from 37 to 45 mN/m inclusive.

* * * * *